Aug. 23, 1927.

F. HANEL 1,640,320

BUFFER FOR MOTOR VEHICLES

Filed Jan. 21, 1927

Inventor:
Franz Hanel.

Patented Aug. 23, 1927.

1,640,320

UNITED STATES PATENT OFFICE.

FRANZ HANEL, OF BERLIN, GERMANY, ASSIGNOR TO FRITZ KÖNIG & CO. GESELL-SCHAFT MIT BESCHRANKTER HAFTUNG, OF MAGDEBURG, GERMANY.

BUFFER FOR MOTOR VEHICLES.

Application filed January 21, 1927, Serial No. 162,550, and in Germany December 2, 1926.

This invention relates to a buffer for motor vehicles and of the kind comprising two nested, laminated leaf springs, the inner spring being arranged so as to support the breast portion of the outer one. Usually the inner spring is rigidly secured to the breast portion of the outer one and does not assist the latter in supporting lateral and oblique thrusts.

The object of the present invention is to improve the spring with a view to render it more resistive to lateral and oblique thrusts, and the invention consists in the provision of an inner spring which bears against the side portions of the outer one and which is looped back upon itself and supported at the extremities on the main spring body, the connection between the spring elements at each supporting point being effected by means of roller clamps which allow slidable relative displacement.

Figure 1:
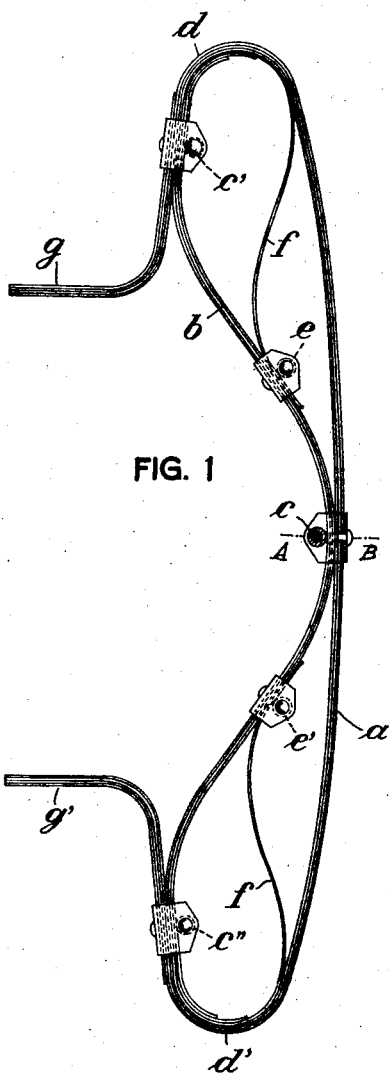
Figure 2:
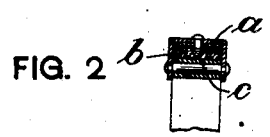
Figure 3:
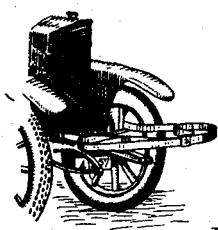

Fig. 1 of the accompanying drawings represents a plan view of the improved buffer, Fig. 2, a cross-section of the same and of one of the clamps, and Fig. 3, a perspective view showing the buffer attached to a vehicle.

The buffer comprises an outer laminated leaf spring the breast portion $a$ and the side portions $d$ and $d'$ of which are curved elliptically while the ends $g$, $g'$ are bent off into a parallel position so as to serve for connecting the buffer to the chassis of a motor vehicle, as indicated in Fig. 3. Another laminated, bow-shaped spring $b$ is nested within the elliptic spring and bears against the latter at both sides and in the center of the breast portion. The ends $f$ of the inner spring, either several leaves together or only one of the leaves as shown, are looped back upon themselves and supported on the main spring body. The connection of the two springs to each other and of the ends $f$ to the main body of the spring $b$ is effected by means of roller clamps $c$, $c'$, $c''$, $e$ and $e'$ which allow the connected elements to be slidably displaced relative to each other.

In the case of head-on shocks, these will be absorbed by the two springs as before, relative displacement taking place under the rollers $c'$ and $c''$. With the present arrangement, however, the two springs will also cooperate in absorbing shocks received from one side or obliquely, relative displacement taking place at the roller $c$ and also at the rollers $e$ and $e'$. Thus the protection of the vehicle will be greatly enhanced.

The leaves of the individual springs are secured together at one or more places either by rivets or by welding.

I claim:

A buffer for motor vehicles of the character described, comprising two nested laminated leaf springs, the outer spring having elliptically curved breast and side portions and parallel ends for connection to the vehicle, the inner spring being bow-shaped and adapted to support the outer spring at the sides and in the center of the breast portions, the ends of the inner spring being looped back upon themselves and supported on the main spring body, and roller clamps holding the spring elements together at each supporting point so as to allow slidable relative displacement, substantially as and for the purpose set forth.

FRANZ HANEL.